United States Patent
Thunuguntla et al.

(10) Patent No.: US 11,941,013 B2
(45) Date of Patent: Mar. 26, 2024

(54) AUTOMATED DATABASE OWNERSHIP ATTRIBUTION

(71) Applicant: INTUIT INC., Mountain View, CA (US)

(72) Inventors: Saikiran Sri Thunuguntla, Bangalore (IN); Sreenivasulu Nallapati, Bangalore (IN); Vijaykumar Hiremath, Bangalore (IN); Vasanth Kumar Jagadeesh, Bangalore (IN)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 17/815,767

(22) Filed: Jul. 28, 2022

(65) Prior Publication Data

US 2024/0037112 A1 Feb. 1, 2024

(51) Int. Cl.
*G06F 16/2458* (2019.01)
*G06F 16/22* (2019.01)
*G06F 16/835* (2019.01)

(52) U.S. Cl.
CPC ...... *G06F 16/2471* (2019.01); *G06F 16/2272* (2019.01); *G06F 16/835* (2019.01)

(58) Field of Classification Search
CPC . G06F 16/2471; G06F 16/2272; G06F 16/835
See application file for complete search history.

(56) References Cited

U.S. PATENT DOCUMENTS

| | | |
|---|---|---|
| 2010/0049694 A1* | 2/2010 | Deffler ............... G06F 16/213 707/769 |
| 2017/0255621 A1* | 9/2017 | Kenthapadi ............. H04L 67/10 |
| 2022/0121665 A1* | 4/2022 | Diskin ............. G06F 16/24526 |

* cited by examiner

*Primary Examiner* — Etienne P Leroux
*Assistant Examiner* — Husam Turki Samara
(74) *Attorney, Agent, or Firm* — DLA PIPER LLP (US)

(57) ABSTRACT

Systems and methods for automated techniques that generate queryable database table ownership attribution information in real-time. In addition to generating ownership attribution information, system and methods provide a novel framework for creating bi-partite graphs and generating insightful graph data.

17 Claims, 5 Drawing Sheets

FIG. 5 ably coupled to the server system 104. The user device(s)
AUTOMATED DATABASE OWNERSHIP ATTRIBUTION

BACKGROUND

In database management the creator of a database table is often designated as the owner. The owner often has elevated permissions with the database table. For example, an owner can change configuration parameters, perform maintenance, and grant permissions on the database to other users. The uses of ownership as it relates to database management can include documenting the teams/entities that are responsible for managing a particular database and/or set of database tables, regulating access right/grants to various entities, managing personally identifiable information, and data governance. In addition, larger organizations usually aggregate and store a vast amount of structured, semi-structured, and unstructured data, in datalake(s), some of which are used for online analytical processing (OLAP). However, not all forms of database storage are similar. For example, databases that are created in MySQL or Oracle for online transaction processing (OLTP) often automatically capture database ownership information at the time they are created. Conversely, databases and database tables created in datalake(s) for OLAP analytical use-cases do not always have ownership information. As such, for large organizations with many databases or database tables in a data lake, identifying the owner that can manage or facilitate the above-mentioned tasks is crucial.

However, subsequent to the creation of a database or database table in a data lake, determining the owner of the database table may be challenging for organizational members unfamiliar with the transfer of database responsibilities. In another example, an organization that manages sensitive information may have multiple departments that are siloed from one another. In this instance, tracking down the owner of the database may be a time-consuming manual process. Moreover, such determinations as to ownership in aggregate across thousands to millions of database tables can create severe organizational workflow bottlenecks.

To address these database management issues, conventional database ownership attribution techniques implement manual resource-intensive processes. For example, some organizations track the owner of a database table via Excel documents saved to individual computers which requires members of the organization to manually contact the manager of the Excel document just identify the owner. Alternatively, some organizations implement risky practices of providing open access to database tables and database management permission to all members. However, organizations violate the principle of least privilege access if they provide members with access to entire database system without regulating access.

Therefore, while existing conventional methods may produce the identity of a database table owner, such techniques involve manual processes that further delay the progression of organizational workflow and cause members within the organization to allocate organizational resources to non-essential tasks. Moreover, such techniques create technical problems with data security and accessibility.

DETAILED DESCRIPTION OF SEVERAL EMBODIMENTS

The instant system and methods provide novel techniques for overcoming the deficiencies of conventional systems by replacing manual processes of soliciting for ownership information with novel automated techniques that generate queryable database table ownership information in real-time, while enhancing security and computing resource efficiency.

Embodiments of the present disclosure relate to systems and methods for creating queryable bi-partite graphs and automated database ownership attribution. The implementation of these novel concepts may include, in one respect, establishing a framework and methods for creating a queryable bi-partite graph with two disjoint sets of data including user information and database table(s) information. The framework may include establishing ownership attribution parameter(s), receiving and analyzing one or more user database commands (e.g., database queries) to create a graph connection with specific edge type (i.e., connection) between one or more users and one or more database tables, assigning a score to each edge type, and storing all edge types and scores in a persistent database for subsequent querying. The framework may be accessible over a network and respond to various application programming interface (API) calls such that the framework may populate database table ownership information in a visible format on a user device.

Figure 1:
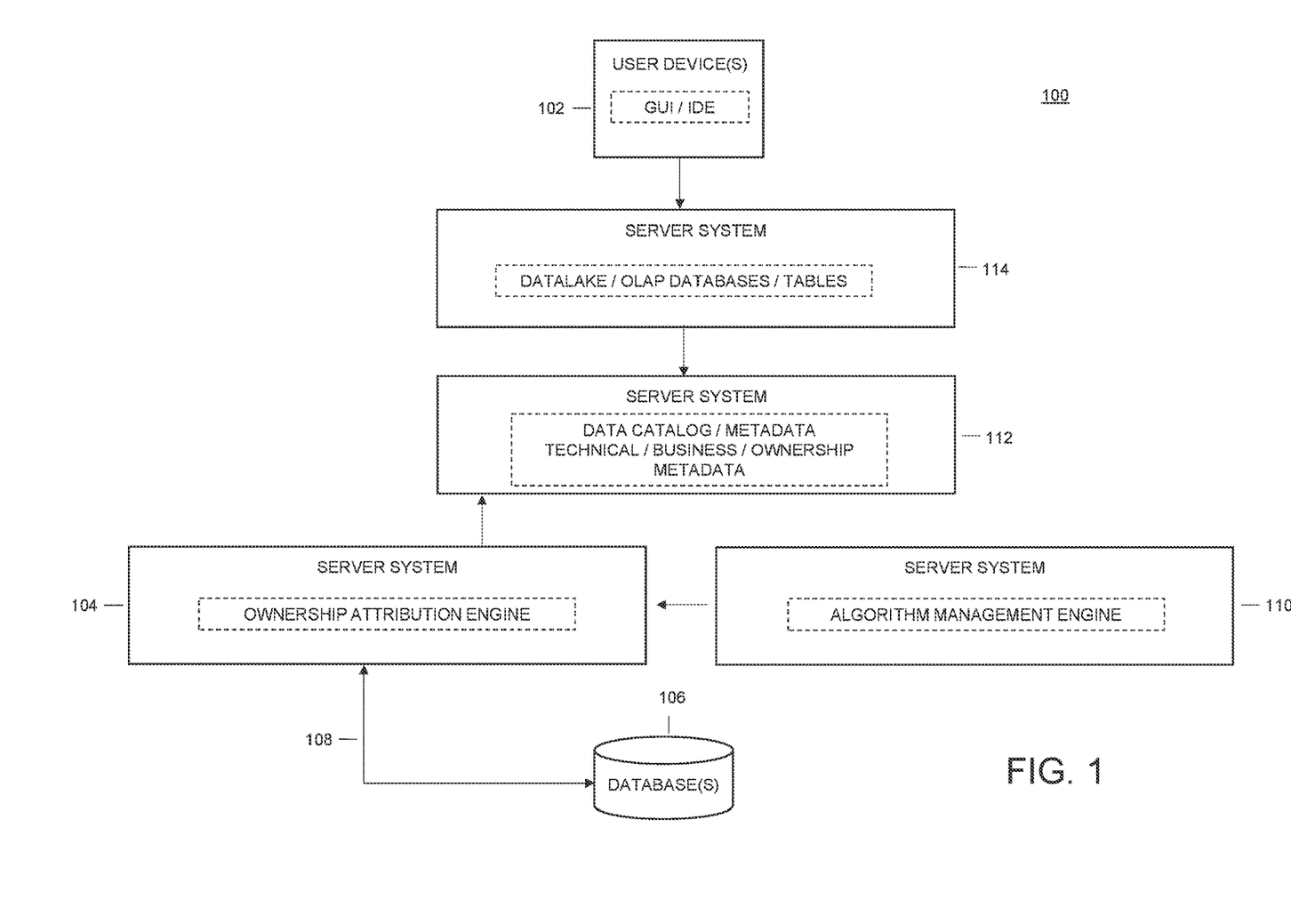
FIG. 1 illustrates a computing environment, according to various embodiments of the present disclosure.

Referring to FIG. 1, computing environment 100 may be configured to create a queryable bi-partite graph that can automatically attribute ownership of database tables, according to embodiments of the present disclosure. Computing environment 100 may include one or more user device(s) 102, a server system 104, and a database(s) 106 communicatively coupled to the server system 104. The user device(s) 102, server system 104, and database(s) 106 may be configured to communicate through network 108.

In one or more embodiments, user device(s) 102 is operated by a user. User device(s) 102 may be representative of a mobile device, a tablet, a desktop computer, or any computing system having the capabilities described herein. Users may include, but are not limited to, individuals such as, for example, software engineers, database administrators, subscribers, employees, clients, prospective clients, or customers of an entity associated with server system 104, such as individuals who have obtained, will obtain, or may obtain a product, service, or consultation from an entity associated with server system 104.

User device(s) 102 according to the present disclosure may include, without limit, any combination of mobile phones, smart phones, tablet computers, laptop computers, desktop computers, server computers or any other computing device configured to capture, receive, store and/or disseminate any suitable data. In one embodiment, a user device(s) 102 may include a non-transitory memory, one or more processors including machine readable instructions, a communications interface which may be used to communicate with the server system (and, in some examples, with the database(s) 106), a user input interface for inputting data and/or information to the user device and/or a user display interface for presenting data and/or information on the user device. In some examples, the user input interface and the user display interface may be configured as an interactive GUI and/or an integrated development environment (IDE). The user device(s) 102 may also be configured to provide the server system 104, via the interactive GUI, input information (e.g., queries) for further processing. In some examples, the interactive GUI may be hosted by the server system 104 or it may be provided via a client application operating on the user device. In some embodiments, a user operating the user device(s) 102 may be modifying one or more software modules or tables stored on database(s) 106.

Server system 104 may host, store, and operate an ownership attribution engine that may include an application programming interface (API) configured to receive graph connections between user-table pairs from one or more algorithms. The API may receive the graph connections, created by user database commands, in response to API calls associated with the one or more algorithms. Server system 104 may receive data associated with graph connections on a continual basis in response to receiving API calls. The server system 104 may include one or more processors, servers, databases, communication/traffic routers, non-transitory memory, modules, and interface components. Server system 104 may include security components capable of monitoring user rights and privileges associated with generating queries, accessing the server system 104, ownership privileges, and modifying database tables in database(s) 106. Server system 104 may manage a framework that is configured to create a bi-partite graph connection with a specific edge type and weight for each unique user database command written by a user interacting with a database and/or database table. These edge type connections and one or more ownership attribution API input parameters may be pushed to server system 104 via one or more independent algorithms configured to evaluate user database commands and user interactions with database resources.

Database(s) 106 may be locally managed and/or a cloud-based collection of organized data stored across one or more storage devices (e.g., graph database, persistent database, etc.). The database(s) 106 may be complex and developed using one or more design schema and modeling techniques. The database system may be hosted at one or more data centers operated by a cloud computing service provider. The database(s) 106 may be geographically proximal to or remote from the server system 104 configured for data dictionary management, data storage management, multi-user access control, data integrity, backup and recovery management, database access language application programming interface (API) management, and the like. The database(s) 106 may be in communication with the server system 104 and the user device via network 108. The database(s) 106 may store various data, including one or more tables, that can be modified via queries initiated by users operating user device(s) 102. Various data in the database(s) 106 may be refined over time using a large language model, for example the large language model discussed infra in FIGS. 2, 3, and 5. Additionally, the database system may be deployed and maintained automatically by one or more components shown in FIG. 1.

In addition, database(s) 106 may configured to support various graph formats and could be a dedicated graph database, or a converged database that supports multiple data models, including graphs. Database(s) 106 may provide graph models to represent relationships in data. As such, database(s) 106 may permit users to perform traversal queries based on connections and apply graph algorithms to find connections, patterns, paths, communities, influencers, and single points of failure, and other relationships, which enable more efficient analysis at scale against massive amounts of data.

Database(s) 106 may store communities, anomalies, common patterns, and paths that connect individuals to other graphs and/or database tables. Notably, since the graphs (e.g., bi-partite graphs) stored in database(s) 106 explicitly store relationships, queries, and algorithms utilizing the connectivity between vertices can be run in sub-seconds rather than hours or days. As such, users can avoid conventional methods of ascertaining similar information (e.g., manually reaching out to individual database owners and the like), and the data can be more quickly and easily used for further analysis; for example, by machine learning algorithm to extrapolate additional insights. Database(s) 106 may communicate and provide various information to server system 104.

Network 108 may be of any suitable type, including individual connections via the Internet, such as cellular or Wi-Fi networks. In some embodiments, network 108 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, LAN, or the Internet. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

For example, network 108 may be the Internet, a private data network, virtual private network using a public network and/or other suitable connection(s) that enables components in computing environment 100 to send and receive information between the components of computing environment 100.

Server system 110 may host, store, and operate an algorithm management engine or the like, for analyzing user commands. For example, server system 110 may store one or more algorithms capable of parsing one or more code repositories, processing engine logs, processing observability information, hosting AWS account information stored on other computing devices (e.g., server system 112). In response to parsing the user commands by the one or more algorithms, server system 110 may analyze the user commands to create a graph connection (i.e., an edge) between the user that initiated the algorithm and the database table that is modified by the algorithm. The server system 110 may then automatically assign a score to each unique edge type pair (i.e., connection between user and database table) and calls server system 104 and publishes user information, table information, unique edge type pair information, score. The server system 104 may include one or more processors, servers, databases, communication/traffic routers, non-transitory memory, modules, and interface components.

Server system 112 may store data and host catalog, metadata, technical, business, and ownership metadata. For example, server system 112 may store metadata and database table ownership information that is accessible for consumption by users accessing computing environment 100 by, for example, user device(s) 102. In addition, server system 112 may receive ownership attribution information from server system 104. For example, server system 112 may receive ownership attribution related data from server system 104 and host the ownership attribution information consumption. Moreover, server system 112 may updated with information on an ongoing basis.

Server system 114 may store and host datalake(s), OLAP database(s), various database tables. The datalake(s) may be a centralized repository configured to stored large amounts of structured and unstructured data, including various database tables, that may or may not have clearly defined ownership information. The datalake(s) may additionally include OLAP database(s). The datalake(s) and OLAP database(s) may be created as a result of users operating user device(s) 102 creating code and/or writing commands.

In some embodiments, communication between the elements may be facilitated by one or more application programming interfaces (APIs). APIs of server system 104, server system 110, server system 112, and server system 114, may be proprietary and/or may be examples available to those of ordinary skill in the art such as Amazon® Web Services (AWS) APIs or the like.

Figure 2:
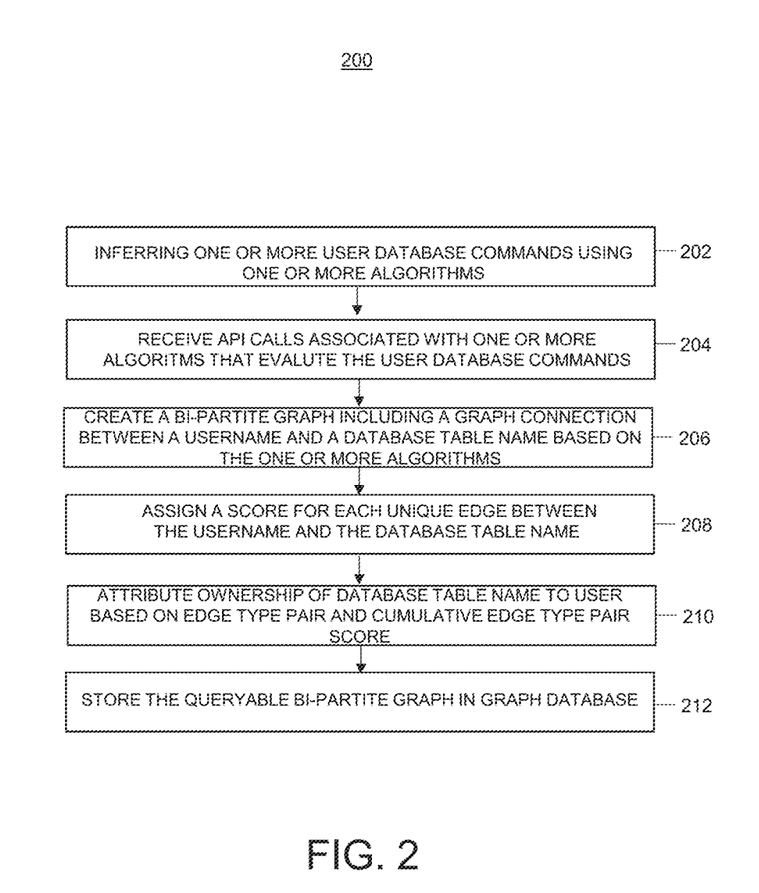
FIG. 2 illustrates a method for creating a bi-partite graph, according to various embodiments of the present disclosure.

Referring to FIG. 2, a method for creating a bi-partite graph 200 is depicted, according to various embodiments of the present disclosure. At 202, a server in computing environment 100 may infer one or more user database commands using one or more algorithms. For example, server system 114 may receive user database commands from user device(s) 102 that can create, modify, read, and/or write to one or more databases or database tables and one or more algorithms parse various user commands, logs, repositories and the like to infer that a particular user or team performed an action with a database and/or database table.

At 204, server system 104 may receive one or more API call associated with one or more algorithms that evaluate user database commends. The one or more algorithms may be configured to parse through code repositories, processing engine logs, processing observability information, hosting AWS account information, to evaluate user table relationship and push data by calling API with input parameters to server system 104, in furtherance of creating the bi-partite graph. For example, server system 104 may receive edge type pair data from one or more algorithms that evaluate user table relationships (e.g., ddl/dml commands associated with Git code and engine Logs, IAM roles used to write data/ Hosting AWS account admins/Encrypted dataset cypher text project team info) on an ongoing basis via API calls. Server system 104 may receive one or more ownership attribution parameters via the one or more algorithms pushing edge type pair data to server system 104. For example, server system 104 may receive one or more parameters related to an algorithm name, a database table name, a username, an edge type name, and an edge weight, in response to one or more algorithms pushing this to a bi-partite framework associated with server system 104 from server system 110. Notably, user database commands may be code created by a user (e.g., data analyst, software engineer, etc.) to create, modify, or delete a database table. In addition, user database commands may also be commands to review code written by others. In addition, the algorithms could be automatically generated by machine learning system or artificial intelligence operated by a user (or team of users).

In one instance, a first algorithm can be configured to parse through various repositories (e.g., GitHub repositories) to evaluate user database commands (e.g., database commands to create a table, and alter a table). Here, this algorithm may be configured to determine that data definition language (DDL) or data manipulation language (DML) statements are present in the user database commands, and based on the presence of these statements, identify the specific user or team that created the user database commands. As such, an edge type pair connection can be created between the user/team that created the user database commands and the database and/or database table that was created or modified.

In another instance, a second algorithm can be configured to parse through various repositories to evaluate user database commands indicative of a user reviewing code or provided comments on code that was previously used to create and/or modify a database or database table. Here this algorithm may be configured to identify a user or team that submitted user database commands to review previously submitted code. As such, an edge type pair connection can be created between the user that reviewed the code and the database and/or database table that was created or modified.

In another instance, a third algorithm can be configured to parse through development job-task logs to evaluate user database commands that create database tables in pre-existing databases. For example, an organization associated with computing environment in FIG. 1, may have a team of users whose responsibilities include creating database tables. As a byproduct of creating tasks for the team, various job logs may be created to track the tasks of the team members. Here, the third algorithm may parse the job logs to identify the specific task that resulted in a database table being created and/or modified. Once the specific task has been identified, additional information, such as the team or team member responsible for the specific task may be inferred. As such, an edge type pair connection can be created between the project team (i.e., set of users) that owns a pipeline that executed code that created the database and/or database table.

In another instance, a fourth algorithm can be configured to parse access management logs to evaluate user database commands that write and write to database tables. For example, an organization associated with computing environment in FIG. 1, may have operate a service the regulates access to database resources. As a byproduct of regulating access database resources, sign-in identities may be created to provide to users and teams to ensure that only authorized users are accessing the database resources. In furtherance of regulating access, access management logs may be created. Here, the fourth algorithm may parse the access management logs, analyze which AccessRole was used to write access to the secure database/database table, and infer which team could access to the given AccessRole. An edge type pair connection can be created between users inferred to have access to the AccessRole and the database/database table that was written to.

In another instance, a fifth algorithm may be configured to parse various directories and buckets/folders that store objects, which consist of data its descriptive metadata to identify the administrator associated with the bucket. For example, an organization associated with computing environment in FIG. 1, may have multiple buckets stored in a public/private cloud associated with an account and account administrator. Here, the fifth algorithm may parse through user database commands to determine where the database or database table is stored. Once the location where the database or database table is stored has been identified, the specific but can be identified; and once the specific is identified, the administrator of the account may be identified. As such, an edge type pair connection can be created between the account administrator and the database and/or database table that was identified as being under the account administrator's purview.

In another instance, a sixth algorithm may be configured to parse user database commands associated with encrypted databases and database tables. For example, encrypted databases may require decryption keys created by project teams in order to be read, otherwise the data cannot be interpreted. Here, the sixth algorithm may determine from the cypher text which project team is reading the database and/or database table. Once the project team has been identified, specific team members of the project team can be identified. As such, an edge type pair connection can be created between the project team members associated with encrypting the database and/or database table, and the database and/or database table itself.

Notably, although six algorithms have discussed, it should be appreciated that any number of algorithms could be leveraged to evaluate user database commands and the six algorithms discussed in detail should not be viewed as limiting. In addition, the one or more algorithms may be leveraged independent or in combination with one another in any number of downstream processes.

At 206 server system 104 may create a bi-partite graph including a graph connection between a user and a database table based on the one or more algorithms received at 204. For example, server system 104 may evaluate the data relationship data received the one or more algorithms to identify username(s), database table name(s), and an algorithm name(s). For example, server system 104 may leverage the data provided by the one or more algorithms discussed at 204 as input parameters for the bi-partite graph framework to create a bi-partite graph. As discussed at 204, the username(s) may be associated with a particular user or team of users that created the algorithm that interacted with a specific database table, which is assigned a unique database table name. The algorithm name(s) reflects the type of action the user (associated with the username) performs on the database table (associated with the database table name). The server system 104 may then create two disjoint sets of vertices for the bi-partite graph by assigning the usernames to a first set and the database table name(s) to a second set, wherein both sets of vertices include nodes. The server system 104 may then create an edge between each username in the first class of nodes to the appropriate database table name in the second class of nodes that the algorithm indicates that the user (associated with the username) interacted with.

At 208 server system 104 may assign a score for each unique edge between the username(s) and the database table name(s). For example, for each unique edge created at 204, server system 104 may assign a score to the edge based on the edge type. The edge type reflects the type of action (e.g., creation, modification, read/write, etc.) that was performed on the database table by the algorithm. In addition, certain edge types may be weighted more heavily than others and thereby receive a higher score. For example, in one embodiment, an edge type that indicates that an algorithm wrote code (e.g., a Data Definition Language (DDL) command) to a database table may receive a higher score than an edge type that indicates that an algorithm merely evaluated the status of database table.

At 210 server system 104 may attribute ownership of a database table to a user based on the edge type and cumulative edge type score associated with the database table. For example, server system 104 may analyze each unique edge type and sum the score for each username edge type pair (i.e., each unique username to database table connection), such that the username associated with a specific edge type and/or username associated with the highest cumulative score (or a score that meets or exceeds a predetermined threshold) can be identified as the owner of the corresponding database table.

At 212, server system 104 may store the queryable bipartite graph in a graph database. For example, the server system 104 may store the queryable bipartite in a graph database configured to use graph structures for semantic queries with nodes, edges, and attributes to enable intensive data relationship handling. Accordingly, server system 104 may store the queryable bipartite graph in a graph database (e.g., database(s) 106) along with the node (i.e., username data and database table data) information, edge information, edge type information, and cumulative score for each unique edge type pair.

Figure 3:
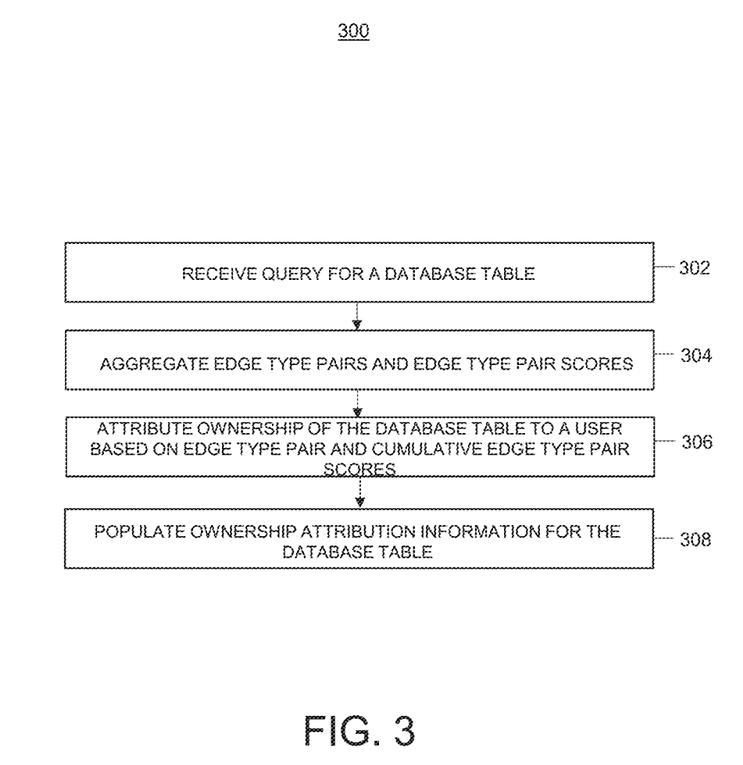
FIG. 3 illustrates a method for responsively populating ownership attribution, according to various embodiments of the present disclosure.

Referring to FIG. 3, a method for responsively populating ownership attribution 300, according to various embodiments of the present disclosure. At 302, server system 104 may receive a query for a database table. For example, server system 104 may receive a query from a user (e.g., a data analyst, software engineer, employee) operating user device(s) 102 requesting information indicating the owner of one or more database table(s).

At 304 server system 104 may aggregate edge type pair(s) and edge type pair score(s). Here, in response to the query received at 302, server system 104 may accumulate all of the edge type pairs and edge type pair scores stored on a queryable bipartite graph in a graph database (e.g., database(s) 106). For example, the query received at 302 may trigger server system 104 to analyze a pre-existing queryable bi-partite graph for edge type pairs created by one or more algorithms previously created by users that interacted with the queryable bi-partite graph.

At 306 server system 104 may attribute ownership of the database table (or database(s)) to a user based on an edge type pair and cumulative edge type pair score. Here, server system 104 may maintain a number of indices of database table names and addresses. Server system 104 may identify a particular vertex associated with a particular database or database table and identifying a number of edge type pairs connecting to that vertex. In one instance, server system 104 may analyze each unique edge type and sum the score for each edge type pair score aggregated at 304, such that the username associated with a specific edge type and/or username associated with the highest cumulative score (or a score that meets or exceeds a predetermined threshold) can be identified as the owner of the corresponding database table.

At 308 server system 104 may populate ownership attribution for the database table. The server system 104 may generate ownership attribution information such as a name (e.g., a team name or an individual's name), an indicator, and/or a symbol signifying the owner of the database table and populate the ownership attribution information in server system 112 (e.g., in a data catalog as part of ownership metadata of the datalake database(s) and database table(s)) and/or a graphical user interface (GUI) or integrated development environment (IDE). For example, server system 104 may store ownership attribution information in a database as metadata, wherein a username (e.g., a specific user's name or team name associated with multiple users) may be identified as the owner and stored as such in association with a database table in the database. In some instances, in addition to storing ownership attribution information in a database, server system 112 may generate instructions to transmit and/or push ownership attribution to user device(s) 102. Further still, ownership attribution information may be dynamically populated in real-time on one or more landing pages, websites, and/or applications being viewed or operated by user device(s) 102. For example, an external website or intranet being viewed by a user may be dynamically modified in response to instructions to populate ownership attribution information being generated. In another example, a data catalog user interface may communicate with a data catalog API to gather metadata including ownership information for one or more datasets from server system 112, in order to dynamically publish the ownership information via the data catalog user interface. Notably, ownership information may be dynamically updated in the data catalog user interface as more ownership attribution data is populated.

Figure 4:
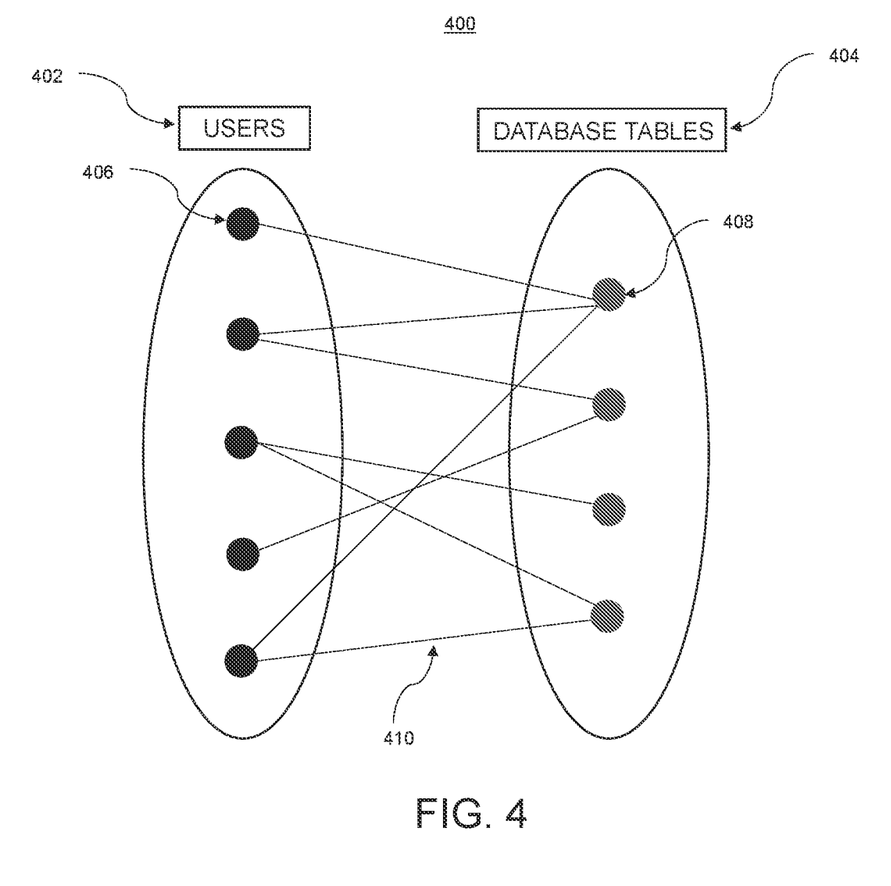
FIG. 4 illustrates a bi-partite graph, according to example embodiments of the present disclosure.

FIG. 4 illustrates a bi-partite graph 400, according to example embodiments of the present disclosure. As depicted shown, the bi-partite graph 400 has vertices that can be divided into two disjoint and independent sets, such that every edge 410 connects a vertex in a first set (i.e., users 402) to one in a second set (i.e., database tables 404). In one non-limiting example, users may be engineers, analysts, data scientists, product managers, customers, and the like. Each independent set may be further comprised of nodes (e.g., user nodes 406 and database table nodes 408). For example, user nodes 406 may represent the one or more users in the users 402 independent set that create the algorithms that interact with database table nodes 408 in the database tables 404 independent set. Moreover, bi-partite graph 400 may be two-colorable, such that vertices in each dependent set are colored with the same color vertices of the same color are never adjacent along an edge.

Server system 104 may evaluate bi-partite graph 400 using one or more formulas or by analyzing its properties. For example, server system may evaluate bi-partite graph 400 to ensure that the sum of the degree of edges (denoted as deg(E)) of a first independent set (i.e., users 402) equals the sum of the degree of edges of a second independent set (i.e., database tables 404), such that:

$$\Sigma E = |E|$$

In another instance, server system 104 may evaluate the number of edges in bi-partite graph 400 relative to the number of vertices. For example, given 'n' vertices, server system 104 may evaluate bi-partite graph 400 to ensure that it has at most $$\tfrac{1}{4} \times n^2 \text{ edges.}$$

Therefore, server system 104 may analyze bi-partite to determine a maximum possible number of edges given an 'n' number of vertices.

Figure 5:
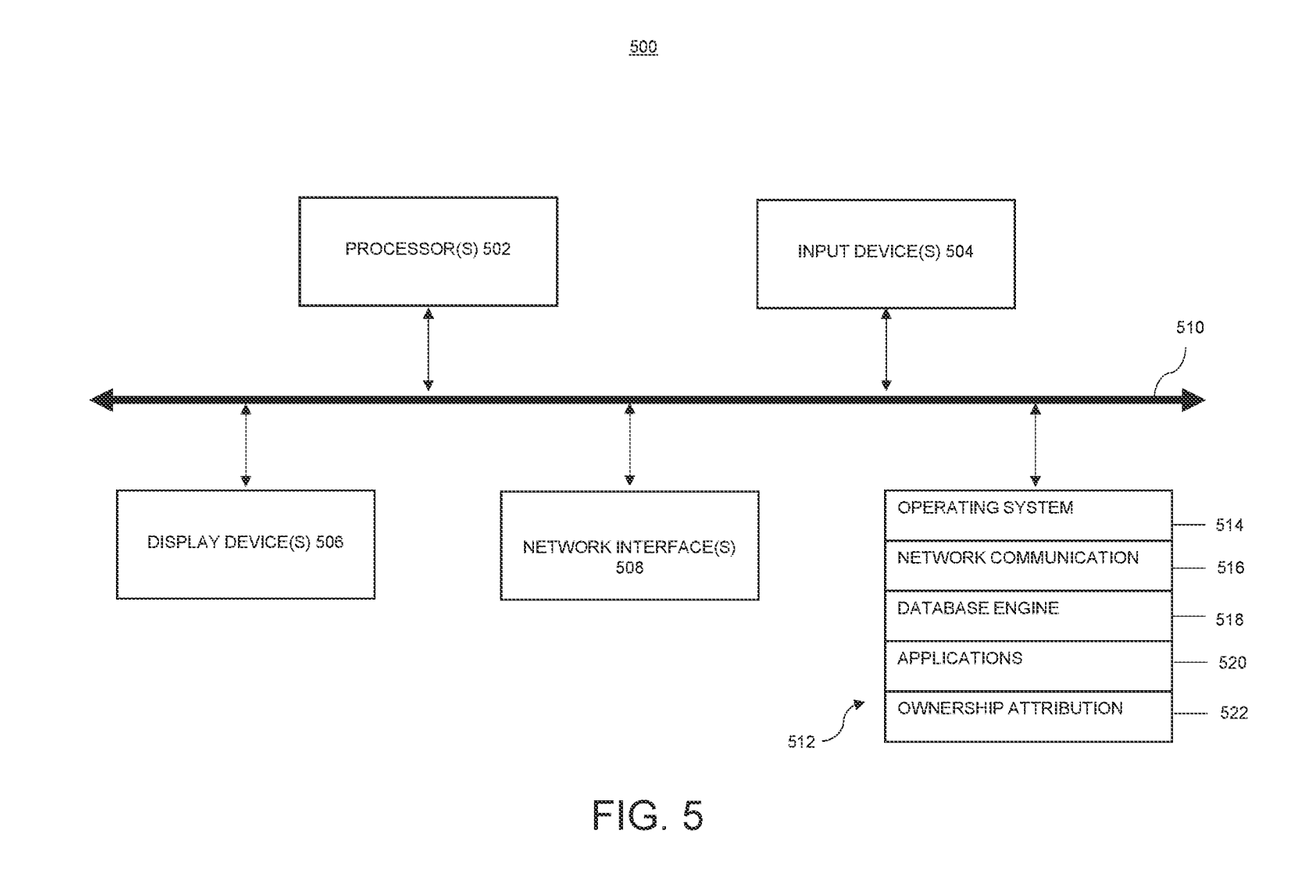
FIG. 5 illustrates a block diagram for a computing device, according to various embodiments of the present disclosure.

FIG. 5 illustrates a block diagram for a computing device, according to various embodiments of the present disclosure. For example, computing device 500 may function as server system 104. The computing device 500 may include a service that provides automatic feedback generation functionality as described above or a portion or combination thereof in some embodiments. The computing device 500 may be implemented on any electronic device that runs software applications derived from compiled instructions, including without limitation personal computers, servers, smart phones, media players, electronic tablets, game consoles, email devices, etc. In some implementations, the computing device 500 may include processor(s) 502, (one or more) input device(s) 504, one or more display device(s) 506, one or more network interfaces 508, and one or more computer-readable medium(s) 512 storing software instructions. Each of these components may be coupled by bus 510, and in some embodiments, these components may be distributed among multiple physical locations and coupled by a network 108.

Display device(s) 506 may be any known display technology, including but not limited to display devices using Liquid Crystal Display (LCD) or Light Emitting Diode (LED) technology. Processor(s) 502 may use any known processor technology, including but not limited to graphics processors and multi-core processors. Input device(s) 504 may be any known input device technology, including but not limited to a keyboard (including a virtual keyboard), mouse, track ball, camera, and touch-sensitive pad or display. Bus 510 may be any known internal or external bus technology, including but not limited to ISA, EISA, PCI, PCI Express, USB, Serial ATA or FireWire. Computer-readable medium(s) 512 may be any non-transitory medium that participates in providing instructions to processor(s) 502 for execution, including without limitation, non-volatile storage media (e.g., optical disks, magnetic disks, flash drives, etc.), or volatile media (e.g., SDRAM, ROM, etc.).

Computer-readable medium(s) 512 may include various instructions for implementing an operating system 514 (e.g., Mac OS®, Windows®, Linux). The operating system may be multi-user, multiprocessing, multitasking, multithreading, real-time, and the like. The operating system may perform basic tasks, including but not limited to: recognizing input from input device(s) 504; sending output to display device(s) 506; keeping track of files and directories on computer-readable medium(s) 512; controlling peripheral devices (e.g., disk drives, printers, etc.) which can be controlled directly or through an I/O controller; and managing traffic on bus 510. Network communications instructions 516 may establish and maintain network connections (e.g., software for implementing communication protocols, such as TCP/IP, HTTP, Ethernet, telephony, etc.).

Intervention engine 518 may include instructions that enable computing device 500 to implement one or more methods as described herein. Application(s) 520 may be an application that uses or implements the processes described herein and/or other processes. The processes may also be implemented in operating system 514. For example, application(s) 520 and/or operating system 514 may execute one or more operations to monitor user interaction (i.e., additional algorithms) that modify a bi-partite graph and automatically generate ownership attribution information.

Ownership attribution engine 522 may be used in conjunction with one or more methods as described above. Input (e.g., one or more algorithms) received at computing device 500 may be fed into ownership attribution engine 522 to create/modify/update a bi-partite graph and/or assign ownership attribution to a particular user or a team of users.

The described features may be implemented in one or more computer programs that may be executable on a programmable system including at least one programmable processor coupled to receive data and instructions from, and to transmit data and instructions to a data storage system (e.g., database(s) 106), at least one input device, and at least one output device. A computer program is a set of instructions that can be used, directly or indirectly, in a computer to perform a certain activity or bring about a certain result. A computer program may be written in any form of programming language (e.g., Janusgraph, Gremlin, Sandbox, SQL, Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random-access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

It is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

What is claimed is:

1. A system comprising:
    at least one server comprising one or more processors; and
    a non-transitory memory, in communication with the at least one server, storing instructions that when executed by the one or more processors, causes the one or more processors to implement a method comprising:
    inferring one or more user database commands using one or more algorithms, wherein the one or more algorithms push information identifying one or more users that created or interacted with one or more database tables using one or more of: database commands, write access roles, or an administrator cloud account, and wherein the one or more algorithms further push ownership attribution parameters reflecting types of actions performed on the one or more database tables;
    publishing user database relationship data via an API call from the one or more algorithms;
    creating, using the ownership attribution parameters as input parameters, a queryable bi-partite graph including a graph connection between one or more usernames and a database table name based on the user database relationship data;

assigning, based on the types of actions performed on the one or more database tables, a score for each unique edge type pair between the one or more usernames and the database table name;
attributing ownership of the database table name to the one or more users based on the unique edge type pair and a cumulative edge type pair score associated with a username of the one or more users, wherein the cumulative edge type pair score is a highest cumulative score from among a plurality of cumulative scores for a plurality of usernames; and
storing the queryable bi-partite graph in a graph database.

2. The system of claim 1, further comprising wherein the one or more algorithms push ownership attribution parameters relating to one or more of: the database table name, the username, an edge type name, and an edge weight, to the at least one server.

3. The system of claim 1, further comprising wherein the one or more user database commands include information indicating a type of action performed on a database.

4. The system of claim 1, wherein attributing ownership is based on the cumulative edge type pair score associated with the one or more users exceeding a predetermined threshold.

5. The system of claim 1, wherein attributing ownership further comprises:
maintaining indices of database table addresses;
identifying a vertex of a database table associated with the database table addresses;
identifying a number of unique edge type pairs at the vertex, wherein each unique edge type pair has corresponding username information;
determining the username and the cumulative edge type pair score for each edge type pair; and
attributing ownership of the database table to the username corresponding to:
the unique edge type pair with the cumulative edge type pair score that exceeds a predetermined threshold; or
the unique edge type pair associated with user database commands or database access action that are indicative ownership attributes.

6. The system of claim 1, wherein the queryablebi-partite graph further comprises two disjoint sets of vertices including a first set associated with usernames and a second set associated with database table names.

7. The system of claim 1, further comprising:
receiving one or more additional API calls associated with the one or more algorithms; and
creating one or more additional graph connections between a username and a database table name based on additional API calls associated with the one or more algorithms.

8. A computer-implemented method for comprising:
inferring one or more user database commands using one or more algorithms, wherein the one or more algorithms push information identifying one or more users that created or interacted with one or more database tables using one or more of: database commands, write access roles, or an administrator cloud account, and wherein the one or more algorithms further push ownership attribution parameters reflecting types of actions performed on the one or more database tables;
publishing user database relationship data via an API call from the one or more algorithms;
creating, using the ownership attribution parameters as input parameters, a queryable bi-partite graph including a graph connection between one or more usernames and a database table name based on the user database relationship data;
assigning, based on the types of actions performed on the one or more database tables, a score for each unique edge type pair between the one or more usernames and the database table name;
attributing ownership of the database table name to the one or more users based on the unique edge type pair and a cumulative edge type pair score associated with a username of the one or more users, wherein the cumulative edge type pair score is a highest cumulative score from among a plurality of cumulative scores for a plurality of usernames; and
storing the queryable bi-partite graph in a graph database.

9. The computer-implemented method of claim 8, further comprising wherein the one or more algorithms push ownership attribution parameters relating to one or more of: the database table name, the username, an edge type name, and an edge weight, to at least one server.

10. The computer-implemented method of claim 8, further comprising wherein the one or more user database commands include information indicating a type of action performed on a database.

11. The computer-implemented method of claim 8, wherein attributing ownership is based on the cumulative edge type pair score associated with the one or more users exceeding a predetermined threshold.

12. The computer-implemented method of claim 8, further comprising:
maintaining indices of database table addresses;
identifying a vertex of a database table associated with the database table addresses;
identifying a number of unique edge type pairs at the vertex, wherein each unique edge type pair has corresponding username information;
determining the username and the cumulative edge type pair score for each edge type pair; and
attributing ownership of the database table to the username corresponding to:
the edge type pair with the cumulative edge type pair score that exceeds a predetermined threshold; or
the edge type pair associated with user database commands or database access action that are indicative ownership attributes.

13. The computer-implemented method of claim 8, wherein the queryable bi-partite graph further comprises two disjoint sets of vertices including a first set associated with usernames and a second set associated with database table names.

14. The computer-implemented method of claim 8, further comprising:
receiving one or more additional API calls associated with the one or more algorithms; and
creating one or more additional graph connections between a username and a database table name based on additional API calls associated with the one or more algorithms.

15. A system comprising:
a server comprising one or more processors; and
a non-transitory memory, in communication with the server, storing instructions that when executed by the one or more processors, causes the one or more processors to implement a method comprising:
receiving a query for a database table, wherein the query for the database table further comprises a request for ownership attribution information;

aggregating edge type pairs and edge type pair scores, where a score for each edge type pair between one or more usernames and database table name has been assigned based on types of actions performed on one or more database tables, the types of actions being reflected by ownership attribution parameters pushed by one or more algorithms;

attributing ownership of the database table to a user based on edge type pair and cumulative edge type pair scores by at least:

identifying a specific vertex associated with a specific database table;

summing a score for each edge type pair connecting to the specific vertex associated with the specific database table, such that a username associated with a specific edge type pair with a highest cumulative score is identified, wherein the highest cumulative edge type pair score is a highest cumulative score from among a plurality of cumulative scores for a plurality of usernames; and generating instructions to populate the ownership attribution information for the database table.

16. The system of claim 15, further comprises dynamically modifying one or more of: a website or an application to display the ownership attribution information.

17. The system of claim 15, wherein attributing ownership is based on a specific cumulative edge type pair score associated with the user exceeding a predetermined threshold.

* * * * *